March 22, 1927.

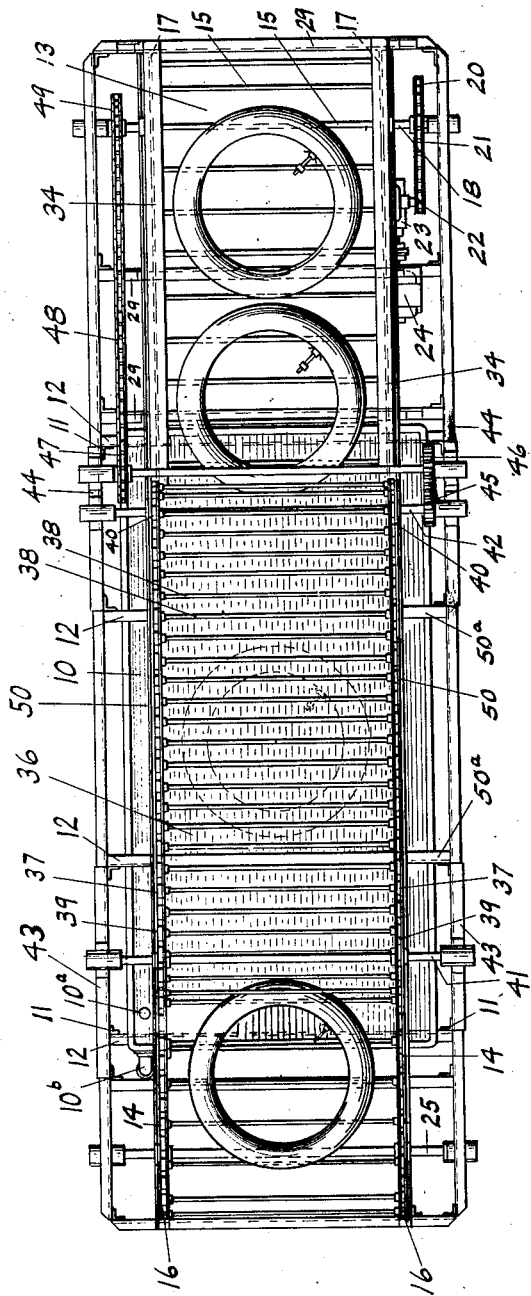

M. H. PADE 1,622,252

DEVICE FOR TESTING INFLATABLE ARTICLES

Filed April 15, 1925    2 Sheets-Sheet 2

INVENTOR.
Max H. Pade
BY
ATTORNEY.

Patented Mar. 22, 1927.

1,622,252

UNITED STATES PATENT OFFICE.

MAX H. PADE, OF AKRON, OHIO, ASSIGNOR TO THE FIRESTONE TIRE AND RUBBER COMPANY, OF AKRON, OHIO, A CORPORATION OF OHIO.

DEVICE FOR TESTING INFLATABLE ARTICLES.

Application filed April 15, 1925. Serial No. 23,404.

This invention relates to devices for testing inflatable articles such as inner tubes or the like of rubber to ascertain whether they are leaky.

The chief object of the invention is to provide a simple, highly effective device for continuously carrying the articles in air inflated condition through a tank containing a liquid whereby observers stationed at the tank can ascertain whether the articles are leaky and can separate the leaky articles from the others as they pass from the tank.

Heretofore, in the art of making inner tubes, they have, as a rule, been tested by the use of manually operated devices including a tank containing a liquid and a manually operated presser element for forcing the tube under the the surface of the liquid in the tank. These devices are slow, a number of them are required, and an operative is required for each device.

The present invention provides for testing tubes or other inflatable articles while traveling continuously in a stream and with the use of a much smaller number of operatives for testing a much greater number of tubes in a given time.

A particular object of the invention is to provide a tank and a conveyor for carrying the articles to and from the tank, the conveyor preferably being adapted to have the articles merely resting thereon, and to provide over the portion of said conveyor in the tank means for holding said articles under the surface of the liquid in the tank.

Another object is to provide as the above means a series of traveling flexibly-connected elements of such weight as to retain the tubes under the liquid level and adapted to cause them to travel even should they float out of contact with the conveyor.

The foregoing and other objects are obtained by the construction shown in the accompanying drawings and described below. It is to be understood that the invention is not limited to the specific construction shown and described.

Of the accompanying drawings,

Figure 1 is a side elevation of a device construction in accordance with the invention.

Figure 2 is a plan thereof, parts being omitted for the sake of clearness.

Figure 3:
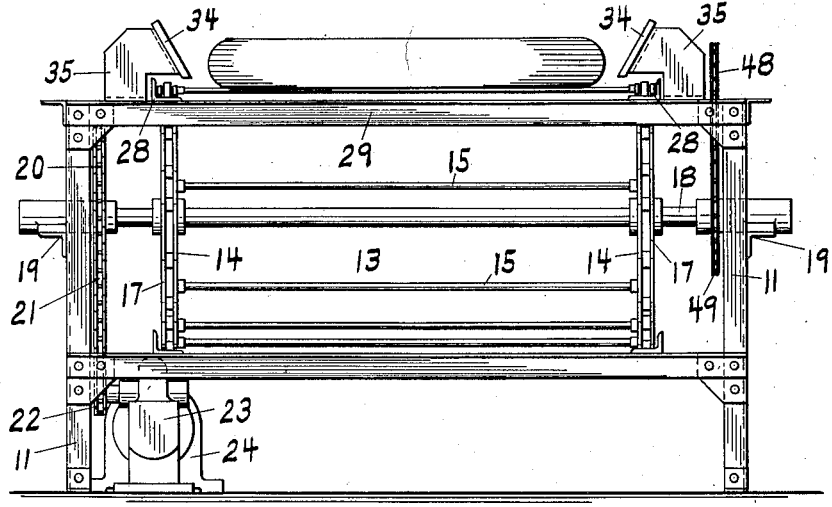
Figure 3 is an enlarged right end view of the feeding-in end of the device.
Figure 4:
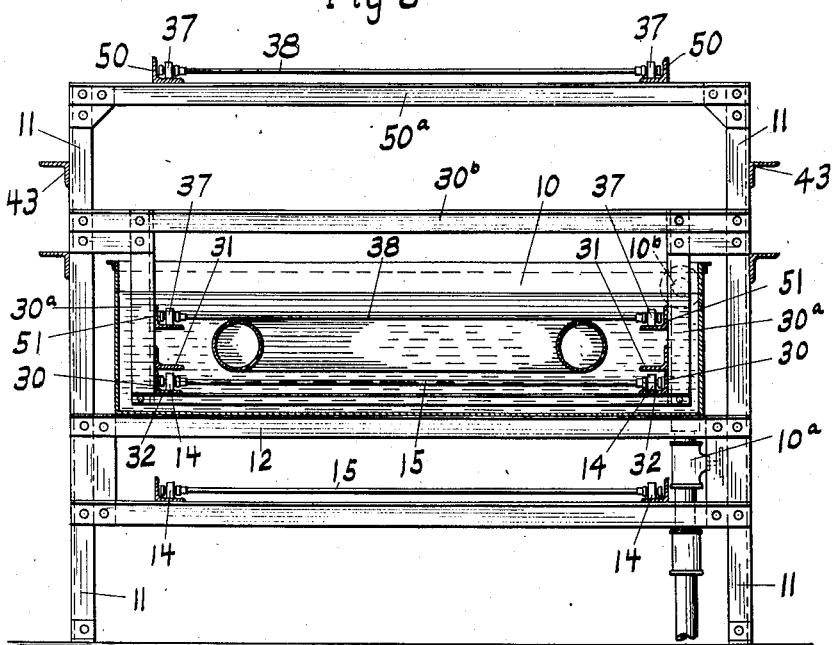
Figure 4 is an enlarged section on line 4—4 of Figure 1.

Referring to the drawings, 10 is a testing tank for holding a liquid such as water, the tank 10 being supported between suitable frame members 11, 11 on cross-bars 12, 12. A waste outlet 10$^a$ and overflow outlet 10$^b$ are provided in tank 10. Arranged for traveling through tank 10 is a conveyor 13 including spaced chains 14, 14 between which extend uniformly spaced article-supporting bars 15, 15. The conveyor 13 is trained over pairs of sprockets 16, 16 and 17, 17, one pair of which (here shown at 17) may be driven as by being secured on a shaft 18, journaled between two frame members 11 at one end of the device and on each side thereof on bars such as indicated at 19, which shaft may be driven by a sprocket 20, chain 21, sprocket 22 through a reduction 23 driven by a motor 24. Sprockets 16 may be carried on a shaft 25 mounted in bearings indicated at 26 adjustable on bars 27, 27 carried by members 11 on each side of the other end of the device, bearings 26 being adjustable so as to take up looseness in conveyor 13.

At the feeding-in end of the device, the chains 14 are adapted to travel on horizontal track rails 28, 28 carried on cross-bars 29 extending between opposite frame members 11. In order to direct the conveyor 13 down into tank 10, through the tank under the level of the liquid and then upwardly out of the tank 10 at the discharge end of the device, spaced, suitably formed track rails 30, 30 are provided, these each having upper and lower retaining flanges 31 and 32 to positively guide the chains 14 through tank 10 and being extended horizontally as at 33, 33 at the discharge end of the device adjacent sprockets 16. The rails 30 are supported in the tank by members 30$^a$, 30$^a$ depending from cross-members 30$^b$, 30$^b$, mounted on opposed members 11. To facilitate supplying the tubes or other articles onto conveyor 13 away from the marginal edges thereof so that the articles will not be harmed or destroyed by being improperly fed into the device, side guard members 34, 34 are so mounted on brackets 35, 35 extending over chains 14 on either side of the machine at the feeding-in end that articles may be quickly and rather carelessly thrown onto conveyor 13 and will be properly positioned thereon. The guards 34 are accordingly sloping inwardly as best shown in Figure 3 to provide for guiding the articles onto conveyor 13.

Since the articles on conveyor 13 will tend to float off of said conveyor as soon as the same passes into the liquid in tank 10, a second conveyor and retaining means indicated by the numeral 36, is provided and is so arranged as to overlie that part of conveyor 13 in tank 10.

Conveyor 36 is of similar construction to conveyor 13 and includes side chains 37, 37 carrying more closely uniformly spaced bars 38, 38 therebetween, the chains 37 being trained over pairs of sprockets 39, 39 and 40, 40 respectively on shafts 41 and 42 journaled on beams as at 43 and 44 extending between two members 11 on each side of the device. Either set of sprockets 39 or 40 may be driven (the latter being so shown) as by a gear 45 on shaft 42 meshed with a gear 46 driven by a sprocket 47, chain 48 and sprocket 49, the latter being on shaft 18. The gearing described above is such that conveyors 13 and 36 will travel at the same speed.

For supporting the upper reaches of chains 37, rails 50, 50 are mounted on crossbars 50ª, 50ª between a pair of members 11 on each side of the machine. The chains are of sufficient length so that they and the bars 38 which they carry will on the lower reach of the conveyor be suspended in tank 10 and will rest and track upon spaced rails 51, 51 passing through tank 10 below the level of the liquid therein, the tracks 51 being supported in tank 10 by members 30ª. The weight per foot of the conveyor 36 is such as to overcome the buoyancy of the tubes thereunder to retain them under the liquid in tank 10.

In operation, conveyors 13 and 36 are continuously driven by motor 24. Operatives inflate the articles such as tubes, and drop them between guards 34 onto conveyor 13. Conveyor 13 carries the articles into tank 10 and as the articles pass into the liquid therein they are engaged by conveyor 36 which presses them under the surface of the liquid and moves them through the tank. Observers standing at the sides of the tank 10 can see between the article engaging bars on the conveyors and note any tubes from which air is leaking and bubbling through the liquid and accordingly will withdraw these from the rest and throw them aside as the tubes are discharged from the device. As the tubes pass out of the liquid at the discharge end they again rest on and are carried by conveyor 13.

It will be seen from the foregoing that a simple but effective apparatus has been provided for feeding the tubes or other articles in a stream to the tank for feeding them through the tank while keeping them depressed below the level of the liquid therein and for carrying them up out of the tank and discharging them from the apparatus after the testing operation.

Modifications of the invention may be resorted to without departing from the spirit thereof or the cope of the appended claims.

What is claimed is:

1. Apparatus for testing inflatable articles comprising a tank for a liquid, conveyor mechanism for loosely supporting the articles and carrying them into and from the tank, and means over said conveyor mechanism in the tank for depressing the articles below the surface of the liquid.

2. Apparatus for testing inflatable articles comprising a tank for a liquid, conveyor mechanism for loosely supporting the articles and carrying them into and from the tank, and means over said conveyor mechanism in the tank for depressing the articles below the surface of the liquid, said means comprising a second conveyor mechanism.

3. Apparatus for testing inflatable articles comprising a tank for a liquid, conveyor mechanism for loosely supporting the articles and carrying them into and from the tank, and means over said conveyor mechanism in the tank for depressing the articles below the surface of the liquid, said means comprising a second conveyor mechanism synchronized with the first conveyor mechanism.

4. Apparatus for testing inflatable articles comprising a tank for a liquid, conveyor mechanism for loosely supporting the articles and carrying them into and from the tank, and means over said conveyor mechanism in the tank for depressing the articles below the surface of the liquid, said means comprising a second conveyor suspended by gravity in the tank and adapted by its weight to overcome the buoyancy of the articles in the tank.

5. Apparatus for testing inflatable articles comprising a tank for a liquid, conveyor mechanism for loosely supporting the articles and carrying them into and from the tank, and means over said conveyor mechanism in the tank for depressing the articles below the surface of the liquid, said means including a series of spaced elements between which the articles can be seen.

6. Apparatus for testing inflatable articles comprising a tank for a liquid, conveyor mechanism for loosely supporting the articles and carrying them into and from the tank, and means over said conveyor mechanism in the tank for depressing the articles below the surface of the liquid, said means including a series of spaced elements between which the articles can be seen, and the weight of which is sufficient to overcome the buoyancy of the articles.

7. Apparatus for testing inflatable articles comprising a tank for a liquid, conveyor mechanism for loosely supporting the articles and carrying them into and from the tank, and means over said conveyor mechanism in the tank for depressing the articles below the surface of the liquid, said means including a traveling series of spaced elements between which the articles can be seen.

8. A device for conveying inflatable articles through a testing tank including a conveyor adapted to receive the articles adjacent one end thereof and guard plates on either side of said conveyor adjacent said end, said plates overlying the marginal edges of the conveyor and adapted to guide the articles onto said conveyor.

9. A device for conveying inflatable articles through a testing tank including a conveyor adapted to receive the articles adjacent one end thereof and guard plates on either side of said conveyor adjacent said end, said plates overlying the marginal edges of the conveyor and sloping inwardly so as to be adapted to guide the articles onto said conveyor.

10. A device for testing inflatable articles comprising a testing tank, a conveyor traveling through the tank, and means for feeding the articles to the tank whereby they will be held against the under side of the conveyor by their buoyancy.

MAX H. PADE.